US011340102B2

(12) United States Patent
Perumalla

(10) Patent No.: US 11,340,102 B2
(45) Date of Patent: May 24, 2022

(54) HANDHELD SOLIDS DISPENSER

(71) Applicant: Seven Star Pharmaceutical Services LLC, Wilmington, DE (US)

(72) Inventor: Sathyanarayana Reddy Perumalla, Downingtown, PA (US)

(73) Assignee: Seven Star Pharmaceutical Services LLC, Wilmington, DE (US)

( * ) Notice: Subject to any disclaimer, the term of this patent is extended or adjusted under 35 U.S.C. 154(b) by 0 days.

(21) Appl. No.: 16/826,980

(22) Filed: Mar. 23, 2020

(65) Prior Publication Data
US 2020/0309583 A1    Oct. 1, 2020

Related U.S. Application Data

(60) Provisional application No. 62/823,893, filed on Mar. 26, 2019.

(51) Int. Cl.
| | |
|---|---|
| *G01F 3/16* | (2006.01) |
| *B05B 11/00* | (2006.01) |
| *B05B 11/02* | (2006.01) |
| *G01F 11/02* | (2006.01) |
| *G01F 11/28* | (2006.01) |
| *G01F 13/00* | (2006.01) |

(52) U.S. Cl.
CPC ............ *G01F 3/16* (2013.01); *B05B 11/0097* (2013.01); *B05B 11/02* (2013.01); *G01F 11/023* (2013.01); *G01F 11/025* (2013.01); *G01F 11/282* (2013.01); *G01F 13/005* (2013.01)

(58) Field of Classification Search
CPC ........ G01F 3/16; G01F 11/023; G01F 11/025; G01F 11/282; G01F 13/005; B05B 11/0097; B05B 11/02
See application file for complete search history.

(56) References Cited

U.S. PATENT DOCUMENTS

| | | | | |
|---|---|---|---|---|
| 3,610,482 A | * | 10/1971 | Van Steenburgh, Jr. | F25C 5/20 222/403 |
| 4,133,460 A | * | 1/1979 | Jerpbak | B29C 45/62 138/177 |
| 4,723,614 A | * | 2/1988 | Lahti | G01G 7/06 177/120 |
| 4,802,609 A | * | 2/1989 | Morse | A47F 1/035 222/158 |
| 5,217,108 A | * | 6/1993 | Newnan | B65D 88/68 198/670 |
| 5,222,634 A | * | 6/1993 | Hayes | A47G 19/34 222/185.1 |

(Continued)

FOREIGN PATENT DOCUMENTS

| | | | | | |
|---|---|---|---|---|---|
| CN | 203841559 U | * | 9/2014 | ............ | A47J 42/04 |
| CN | 204995263 U | * | 1/2016 | ............ | A47J 42/04 |
| GB | 2435609 A | * | 9/2007 | ............ | A47J 31/005 |

*Primary Examiner* — Frederick C Nicolas
(74) *Attorney, Agent, or Firm* — Massina Pat. & TM Law PLLC

(57) ABSTRACT

A handheld solids dispenser. The dispenser includes a housing defining an inlet passage and an outlet passage. A delivery mechanism is supported within the housing and is positioned between the inlet passage and the outlet passage. Actuation of the delivery mechanism causes the delivery mechanism to transport a desired amount of solids material from the inlet passage to the outlet passage. The delivery member may be in the form of a plunger slidably positioned within the housing. The delivery mechanism may be in the form of a screw conveyor driven by a drive motor.

9 Claims, 17 Drawing Sheets

(56) References Cited

U.S. PATENT DOCUMENTS

| | | | | |
|---|---|---|---|---|
| 5,480,095 A * | 1/1996 | Stevenson | B05B 11/0005 | 239/104 |
| 5,524,796 A * | 6/1996 | Hyer | B65G 33/18 | 198/662 |
| 5,826,754 A * | 10/1998 | Ishaya | G07F 11/44 | 222/185.1 |
| 5,988,461 A * | 11/1999 | Edney | B22D 17/2007 | 222/638 |
| 6,253,959 B1 * | 7/2001 | Gaultney | G01F 13/005 | 222/413 |
| 6,527,147 B2 * | 3/2003 | Wehrmann | B65B 37/08 | 222/185.1 |
| 6,679,402 B1 * | 1/2004 | D'Alayer De Costemore D'Arc | A47J 31/4492 | 222/413 |
| 6,834,779 B2 * | 12/2004 | Ufheil | A47J 31/404 | 222/1 |
| 6,932,245 B2 * | 8/2005 | Whippie | G01F 13/005 | 222/181.1 |
| 7,461,763 B1 * | 12/2008 | Winn | A47F 1/03 | 222/158 |
| 8,851,341 B2 * | 10/2014 | Nielsen | G01F 11/261 | 222/455 |
| 2001/0017303 A1 * | 8/2001 | Mckenzie | B65D 90/08 | 222/181.1 |
| 2008/0314935 A1 * | 12/2008 | Spargo | G01F 13/001 | 222/413 |
| 2012/0024893 A1 * | 2/2012 | Mills | G01F 13/005 | 222/63 |
| 2013/0126556 A1 * | 5/2013 | Riester | A23G 9/22 | 222/135 |
| 2017/0247170 A1 * | 8/2017 | Bilton | G01F 11/021 | |
| 2017/0281471 A1 * | 10/2017 | Hamilton | A61J 7/0076 | |

* cited by examiner

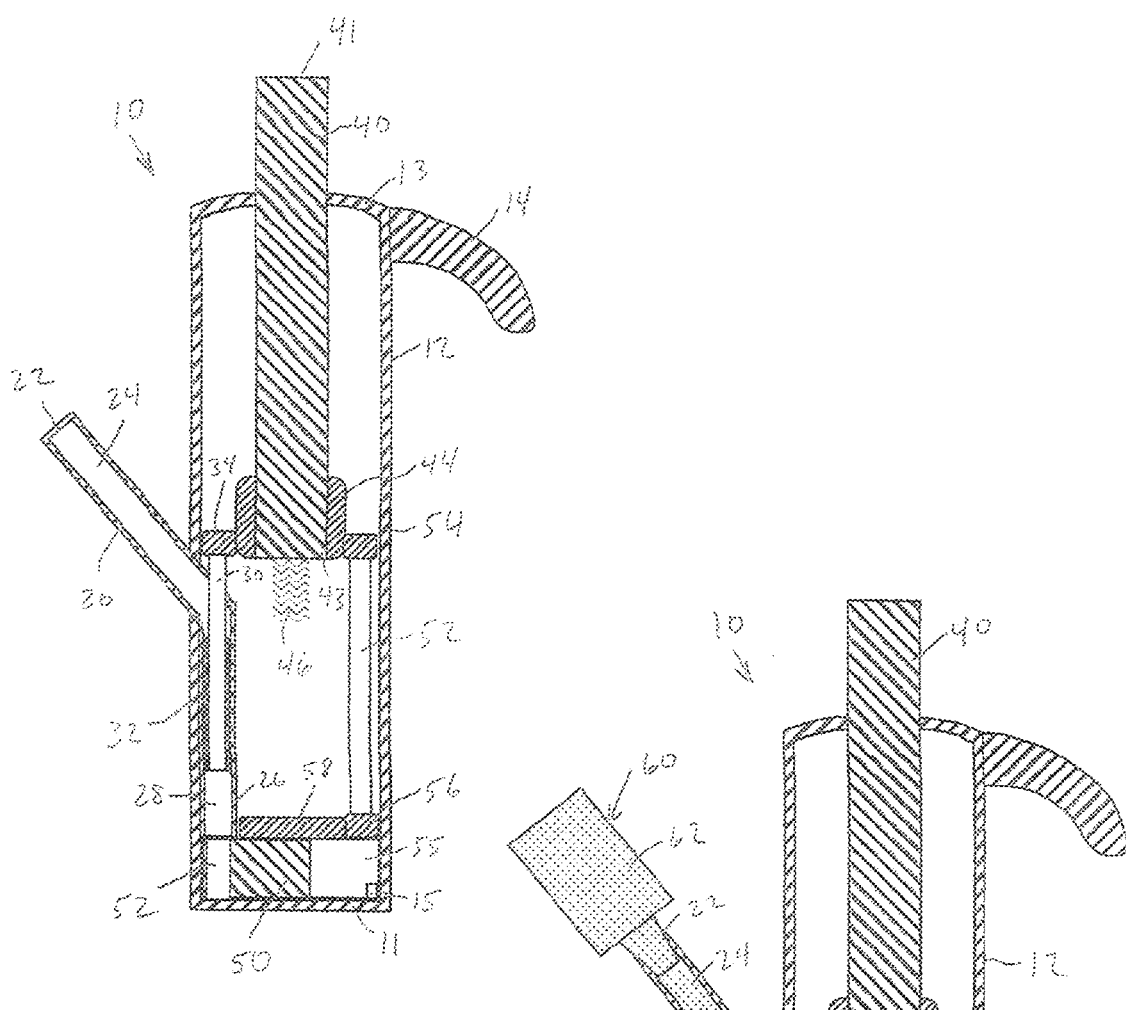
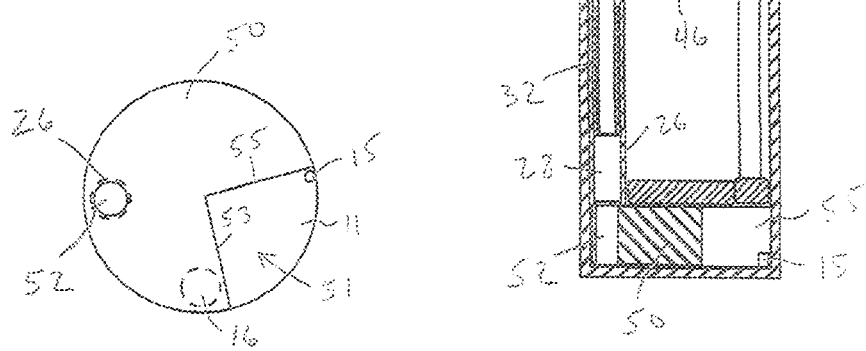
Fig. 3    Fig. 4A    Fig. 4

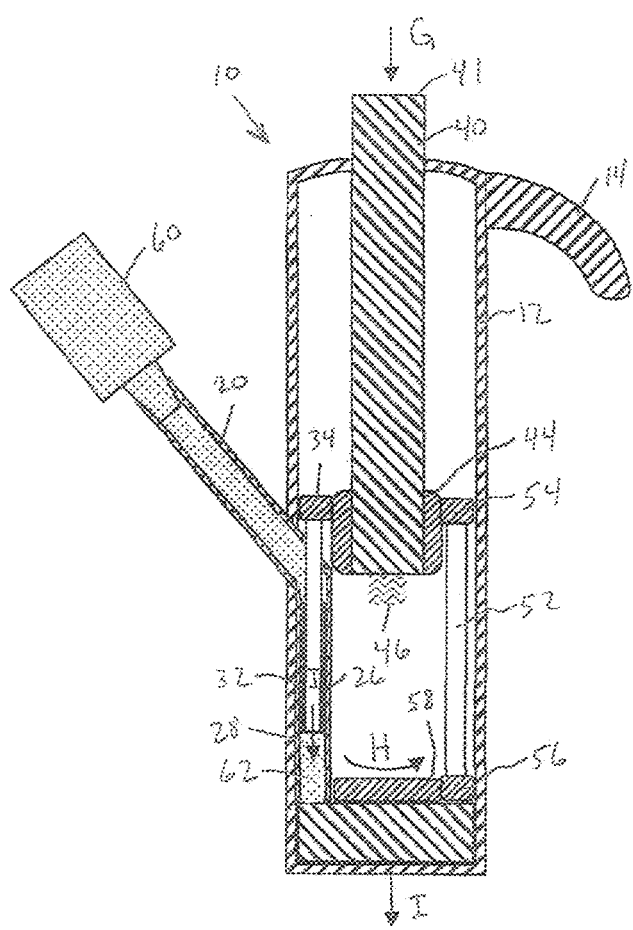
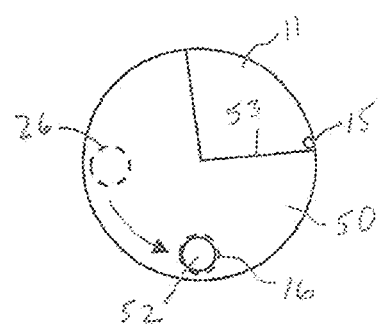
Fig. 7
Fig. 7A

HANDHELD SOLIDS DISPENSER

This application claims the benefit of U.S. Provisional Application No. 62/823,893, filed Mar. 26, 2019, the contents of which are incorporated herein by reference.

FIELD OF THE INVENTION

This invention relates to a dispensing of solid material. More particularly, the invention relates to a handheld solids dispenser.

BACKGROUND OF THE INVENTION

One of the very well-known common laboratory tasks is dispensing milligram quantities of the solids (especially in research and development labs) in a highly precise manner. A vast majority of innovative ideas are tested using limited quantities of solids. In some instances, a single stock powder needs to be dispensed to prepare 100s of samples in small precise quantities, for example, for 1) solid form screening, or 2) filling formulated powders in capsules for preclinical studies.

Current practices in this regard involve manually dispensing the solids in a controlled way using spatulas. In addition to possible chemical exposure, this tedious process often requires lots of time and workforce which is not efficient. Additionally, the process is susceptible to spilling or cross contamination of materials. The challenges increase exponentially if the processes comprise with semi high throughput screening, static and sticky materials. These problems increase when using high potency compounds. Approximately 25% of new chemical entities entering into the market are considered to be potent.

While there have been some high throughput automated systems, these systems are generally not realistic options for a majority of labs as these devices are very costly, occupy a large space and can't be moved that easily.

There is a need for an economical, handheld device which can dispense solids precisely and more efficiently.

SUMMARY OF THE INVENTION

In at least one embodiment, the present invention provides a handheld solids dispenser. The dispenser includes a housing defining an inlet passage and an outlet passage. A delivery mechanism is supported within the housing and is positioned between the inlet passage and the outlet passage. Actuation of the delivery mechanism causes the delivery mechanism to transport a desired amount of solids material from the inlet passage to the outlet passage.

In at least one embodiment, the present invention provides a handheld solids dispenser. The dispenser includes a housing defining an inlet passage and an outlet passage. A delivery mechanism is supported within the housing and is positioned between the inlet passage and the outlet passage. The delivery mechanism is a delivery member defining a delivery chamber and the delivery member is positioned within the housing and moveable between a first position wherein the delivery chamber is aligned with the inlet passage and a second position wherein the delivery chamber is aligned with the outlet passage. Actuation of the delivery mechanism causes the delivery mechanism to transport a desired amount of solids material from the inlet passage to the outlet passage.

In at least one embodiment, the present invention provides a handheld solids dispenser. The dispenser includes a housing defining an inlet passage and an outlet passage. A delivery mechanism is supported within the housing and is positioned between the inlet passage and the outlet passage. The delivery mechanism is motor driven screw conveyor. Actuation of the delivery mechanism causes the delivery mechanism to transport a desired amount of solids material from the inlet passage to the outlet passage.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 3 is a cross-sectional view along the line 3-3 in FIG. 2.

FIGS. 4 and 4A illustrate the solids dispenser of FIG. 1 in an initial position.

FIGS. 7 and 7A illustrate the solids dispenser of FIG. 1 in a subsequent plunger pressed position.

DETAILED DESCRIPTION OF THE INVENTION

Figure 1:
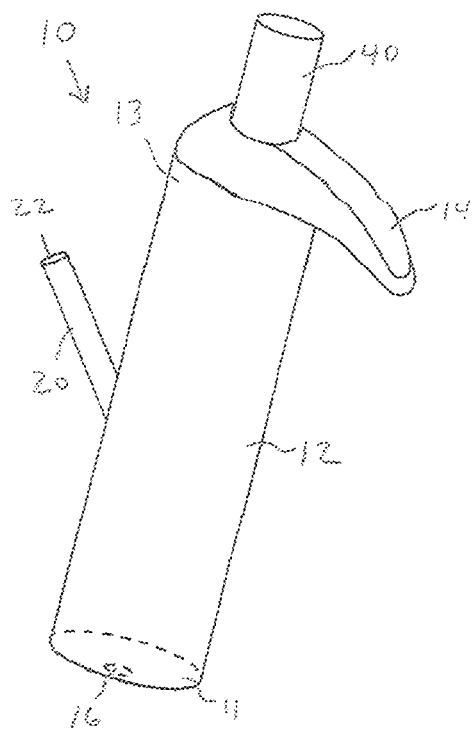
FIG. 1 is a perspective view of a solids dispenser in accordance with an embodiment of the invention.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-7A, an exemplary embodiment of a solids dispenser 10 in accordance with an embodiment of the invention will be described. The dispenser 10 generally comprises a housing 12 with an outlet 16, an input tube 20 and a plunger 40. The housing 12 extends from a generally closed end 11 which defines the outlet 16 to a top end 13 through which the plunger 40 extends. While the outlet 16 is illustrated as a simple opening, it can have other configurations, for example, an extending valve. A handle portion 14 may extend from the body 12, for example near the top end 13, to support the dispenser 10 on a user's fingers when the plunger 40 is depressed.

Figure 2:
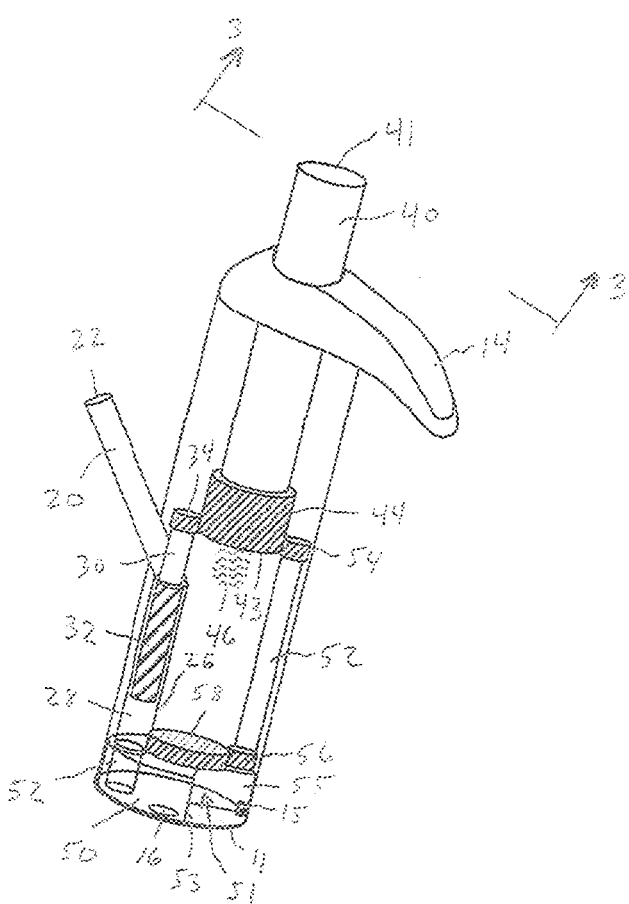
FIG. 2 is a perspective view of the solids dispenser of FIG. 1 with several components shown transparently.

Referring to FIGS. 2-4, the input tube 20 has an opening 22 to a hollow passage 24 which is communication with a delivery tube 26 within the housing 12. The opening 22 is configured to receive a bottle 60 or the like containing the solids material 62. While the bottle 60 is shown in a friction fit within the opening 22, other configurations may be utilized, for example, a threaded connection or a flexible gasket connection. The direct connection of the bottle to the input tube 20 allows the materials to be dispensed with reduced chemical exposure to the technician.

To control flow of the solids material 62, the present embodiment of the invention includes a screw conveyor 32 extending within the delivery tube 26. A shaft 30 extends from the screw conveyor 32 and is connected to a drive gear 34. Rotation of the drive gear 34, as will be described hereinafter, causes the screw conveyor 32 to rotate and controllably deliver solids material 52 to an end portion 28 of the delivery tube 26. In applications wherein the solids material are free flowing, i.e. non-clumping and the like, the screw conveyor may not be necessary. The position of the delivery tube 26 is circumferentially offset from the position of the outlet 16 such that material does not freely flow from the delivery tube 26 to the outlet 16.

A delivery disk 50 is pivotally supported on the closed end 11 of the hollow tube 12. The delivery disk 50 is configured to receive material from the delivery tube 26 and transport it to the outlet 50. In this regard, the delivery disk 50 defines a delivery chamber 52 which receives solids material 62 from the end portion 28 of the delivery tube 26 when the disk 50 is in an initial position as shown in FIGS. 3 and 4. The delivery chamber 52 has a volume equal to the amount of solids material 62 intended to be delivered. That is, in the initial position, the delivery chamber 52 fills with the solids material 26 which is equal to the amount to be delivered. As will described in more detail hereinafter, the delivery disk 50 is thereafter rotated until the delivery chamber 52 aligns with the outlet 16, at which time the solids material 62 is dispensed. To change the amount of material dispensed, disks 50 having delivery chambers 52 of different volumes may be interchanged within the housing 12. As another alternative, inserts (not shown) defining different volumes may be positionable within the delivery chamber 52 to achieve a desired delivery volume. As another alternative, the delivery chamber may have a moveable wall which is moved to adjust the volume, for example, utilizing a threaded adjustment.

In the illustrated embodiment, the delivery disk 50 has a wedged shape cutout 51 which defines opposed contact surface 53, 55 which define the range of rotation of the disk 50. As shown in FIG. 4A, when the disk 50 is in the initial position when the plunger 40 is not depressed, the contact surface 55 is against the stop member 15 and the delivery chamber 52 is aligned with the delivery tube 26. When the plunger 40 is depressed, as discussed hereinafter, the delivery disk 50 rotates until the contact wall 53 is against the stop member 15 and the delivery chamber 52 is aligned with the outlet 16. Preferably the outlet 16 has a diameter equal to or greater than the diameter of the delivery chamber 52. To facilitate rotation of the disk 50, a drive gear 58 is connected thereto. The drive gear 58 is driven by a drive shaft 52 with gears 54, 56 at each end thereof, with the upper gear 54 engaged with the gear 44 on the plunger 40 and the lower gear 56 engaged with the drive gear 58.

The plunger 40 extends from a first end 41 external to the housing 12 to a second end 43 with a worm type gear 44 thereon. The worm gear 44 is configured to contact the gears 34, 54 which are worm wheels, such that linear motion of the worm gear 44 causes rotational movement of the gears 34, 54. As such, depressing of the plunger 40 causes the gear 34 to rotate and thereby rotate the screw conveyor 32. The preferred gear 34 is configured as a unitary direction gear such that it rotates when the plunger 40 is depressed but does not rotate in the opposite direction when the plunger is released. Depressing of the plunger 40 also causes the gear 54 to rotate and thereby rotate the delivery disk 50. Gear ratios between the worm gear 44 and the gears 34, 54, 56, 58 can be controlled to achieve the desired rotation. For example, the smaller gear 34 will cause the screw conveyor 32 to rotate several times while the larger drive gear 58 will achieve only a quarter turn of the delivery disk 50. A spring 46 or the like engages the inner end 43 of the plunger 40 to bias the plunger 40 back to the initial position when the plunger 40 is released.

It is understood that other mechanisms may be utilized to convert the linear motion of the plunger 40 to rotatory motion. For example, a shaft having a spiral cut groove, similar to a yankee screwdriver, may extend between the plunger 40 and the disk 50. A fixed follower extends into the spiral cut groove such that as the shaft moves linearly, it is caused to rotate and thereby rotate the disk 50. A gear is positioned along the shaft to engage the drive gear 34 of the screw conveyor 32 such that the rotating shaft again causes rotation of the screw conveyor 32. Again, a spring would cause the plunger 40 to return to its initial position, thereby causing the shaft to rotate in the opposite direction. Again, the invention is not limited to the described mechanisms and other mechanisms may also be utilized.

Figure 5:
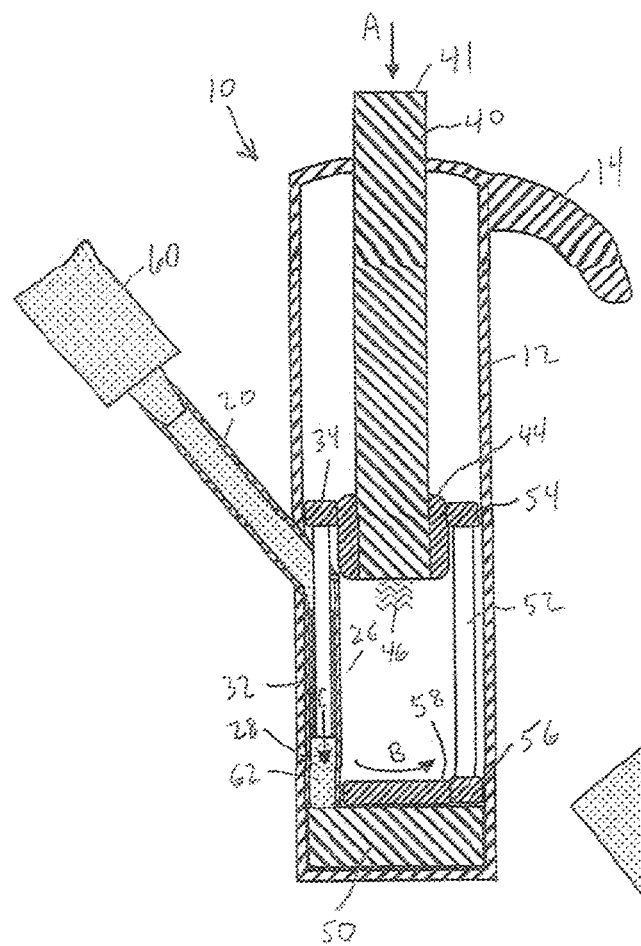
FIGS. 5 and 5A illustrate the solids dispenser of FIG. 1 in an initial plunger pressed position.
Figure 5A:
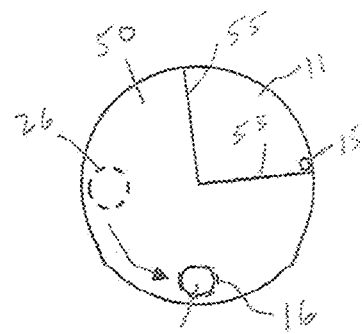

Having described the general components of the solids dispenser 10, operation thereof will be described with reference to FIGS. 4-7A. During initial use, as shown in FIGS. 4 and 4A, the material bottle 60 is connected to the input tube 20 and solids material 62 flows through the hollow passage 24 and into contact with the screw conveyor 32 in the delivery tube 26. Since it is the initial use, the dispenser 10 must be primed to deliver material into the end portion 28 of the delivery tube 26. Referring to FIGS. 5 and 5A, priming is achieved by depressing the plunger 40 as indicated by arrow A. As the plunger 40 is depressed, the disk 50 is caused to rotate, as indicated by arrow B, such that the delivery chamber 52 is not aligned with the delivery tube 26. As such, material delivered by rotation of the screw conveyor 32 is delivered into the end portion 28 as indicated by arrow C.

Figure 6A:
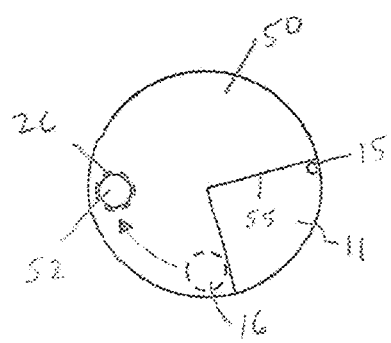
FIGS. 6 and 6A illustrate the solids dispenser of FIG. 1 in a plunger released position.
Figure 6:
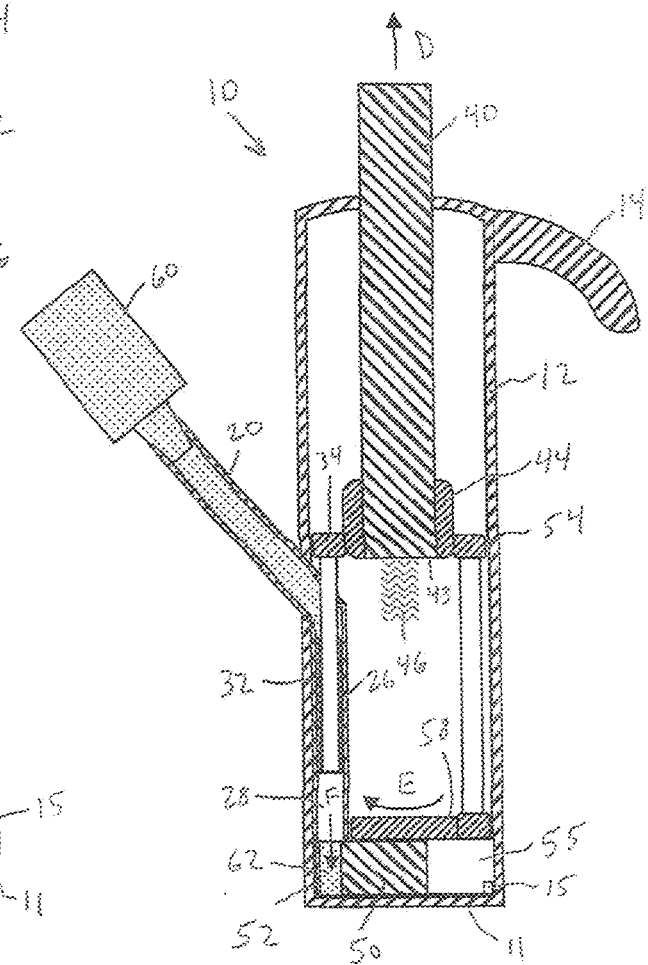
Figure 8:
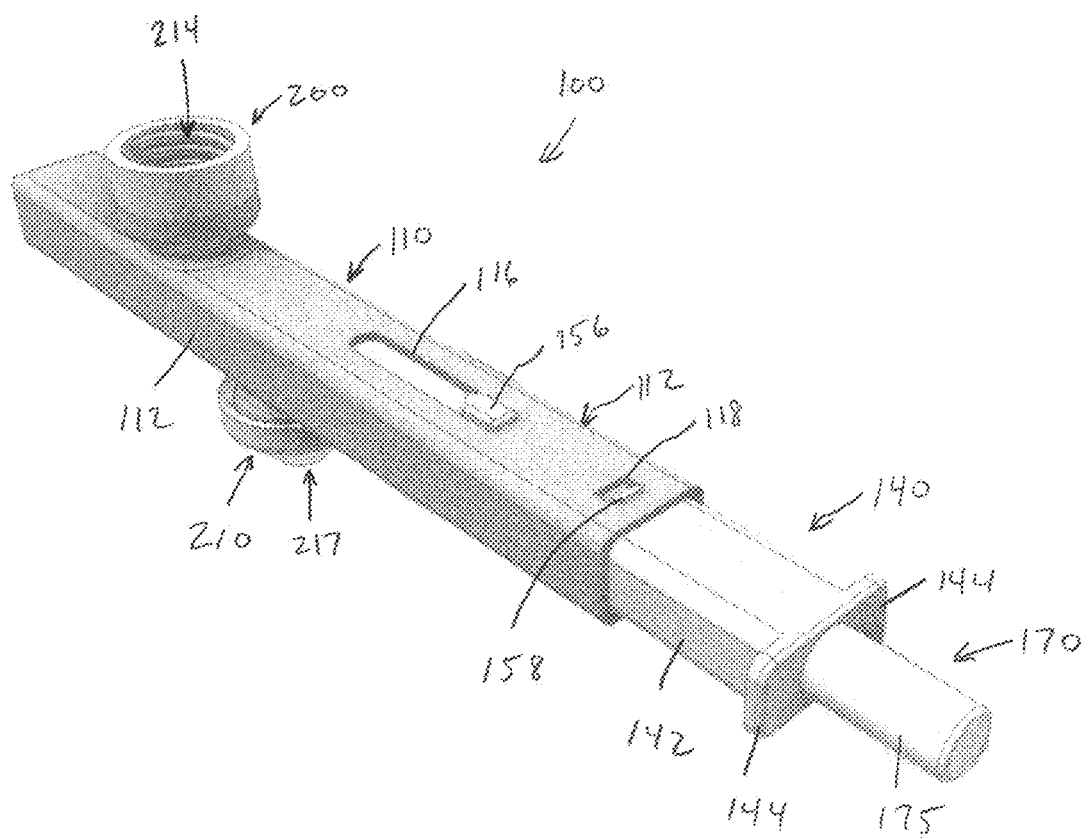
FIG. 8 is a perspective view of a solids dispenser in accordance with another embodiment of the invention.

Turning to FIGS. 6 and 6A, when the plunger 40 is released, it is biased to the initial position as indicated by arrow D. As the plunger 40 moves to the initial position, the drive gear 58 rotates in the opposite direction, as indicated by arrow E, causing the disk 50 to rotate to the initial position with the delivery chamber 52 aligned with the delivery tube 26. With such alignment, the solids material 62 in the end portion 28 is free to fill the delivery chamber 52, as indicated by arrow F.

Turning to FIGS. 7 and 7A, the solids material 62 in the delivery chamber 52 is dispensed by depressing the plunger 40. As the plunger 40 is depressed, as indicated by arrow G, the delivery disk 50 is caused to rotate as indicated by arrow H. The disk 50 rotates until the delivery chamber 52 is aligned with the outlet 16. With such alignment, the solids material 62 in the delivery chamber 52 is dispensed through the outlet 16 as indicated by arrow I. During such plunger 40 depression, the screw conveyor 32 is rotated and again fills the end portion 28 of the delivery tube 26. The plunger 40 is released and the process repeats, returning to the arrangement shown in FIGS. 6 and 6A.

Referring to FIGS. 8-24, a handheld solids dispenser 100 in accordance with another embodiment of the invention will be described. Similar to the previous embodiment, the solids dispenser 100 includes a plunger 140 defining a delivery chamber 155 of a desired volume. In the present embodiment, the plunger 140 is moveable such that the delivery chamber 155 moves along a linear path between an inlet opening 204 and an outlet port 217. The plunger 140 is slidable within an outer housing 110 which supports the inlet opening 204 and outlet port 217. A spring 147 or the like within the outer housing 110 automatically moves the plunger 140 from the initial position aligned with the inlet opening 204 to the dispensing position aligned with outlet port 217 upon actuation. The plunger 140 includes an adjustment rod 170 which allows for each adjustment of the volume of the delivery chamber 155 without disassembly of the dispenser 100. The various components and operation of the dispenser 100 will now be described in more detailed.

Figure 9:
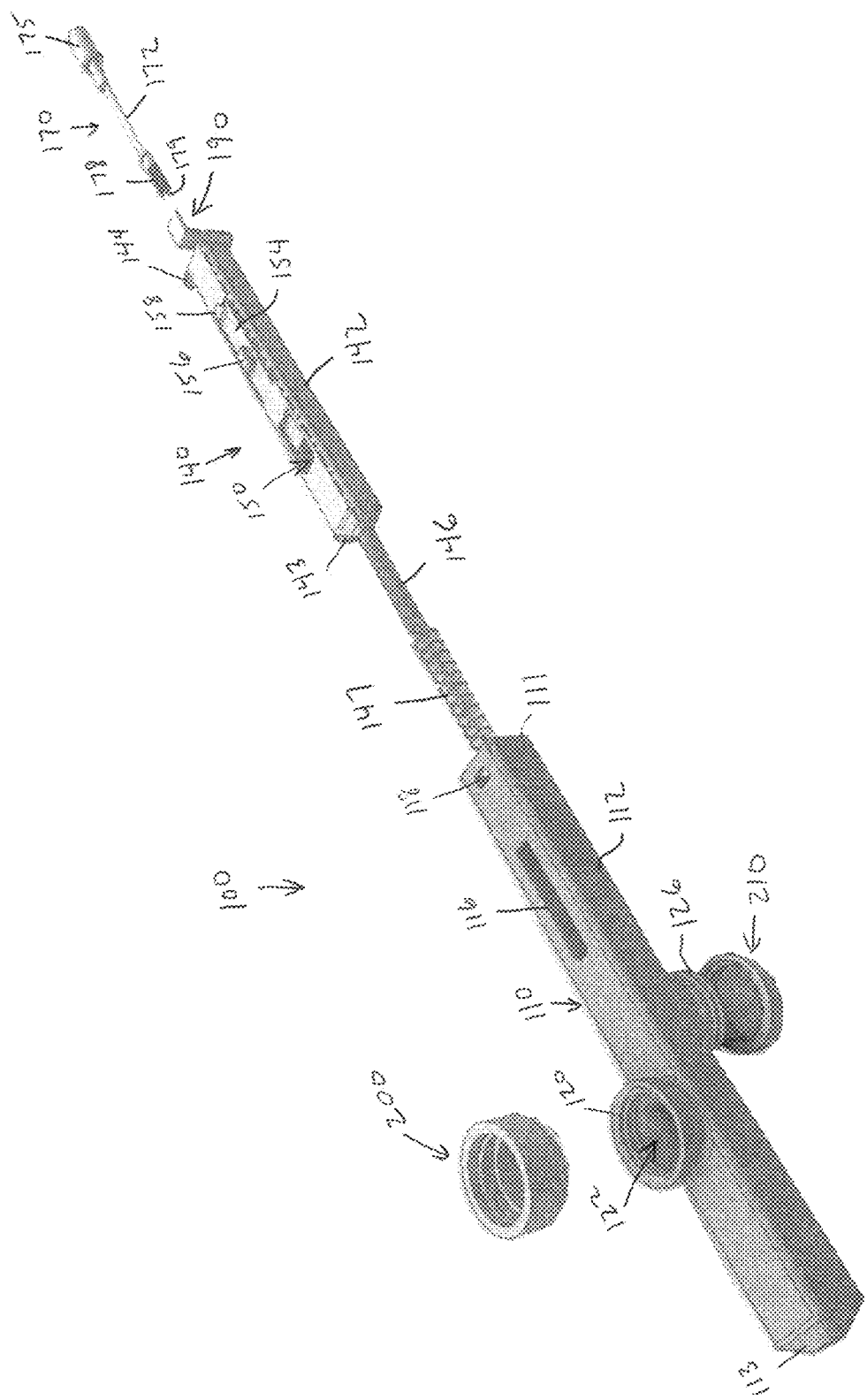
FIG. 9 is an exploded perspective view of the solids dispenser of FIG. 8.
Figure 10:
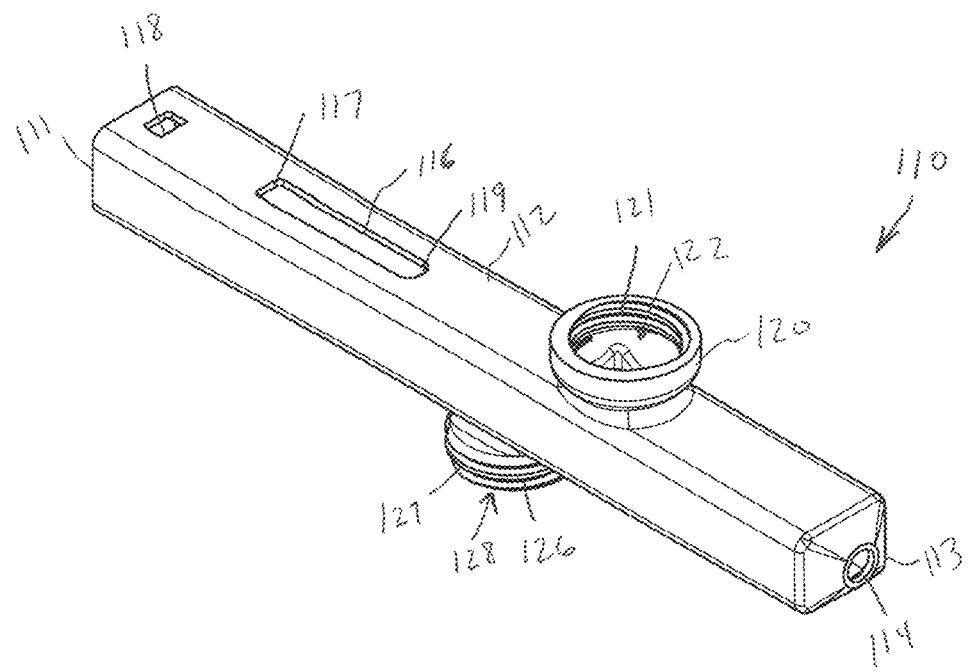
FIG. 10 is a perspective view of an outer housing of the solids dispenser of FIG. 8.
Figure 11:
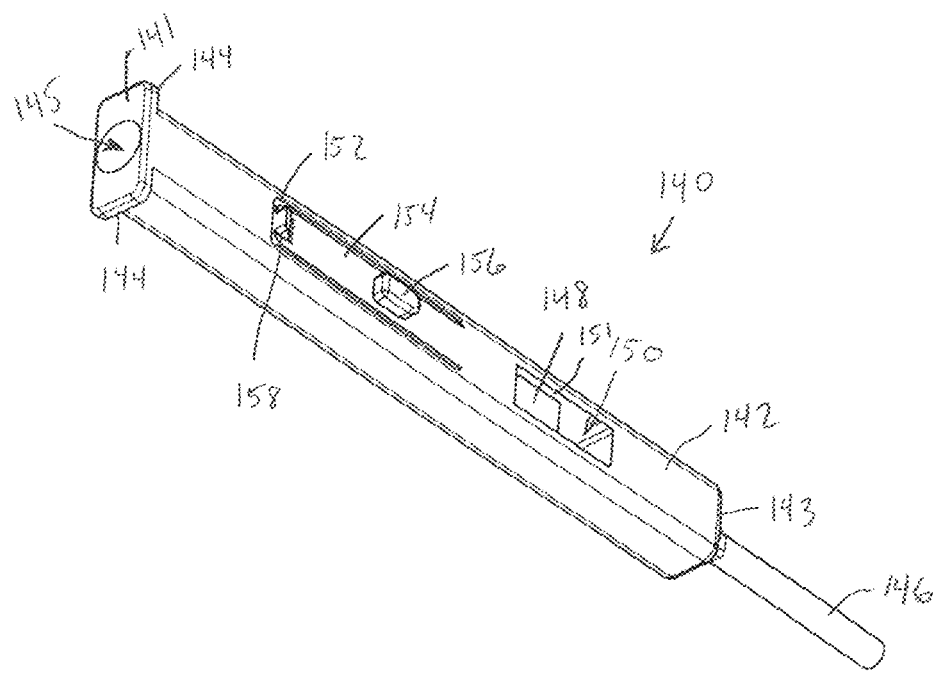
FIG. 11 is a perspective view of a plunger of the solids dispenser of FIG. 8.
Figure 19:
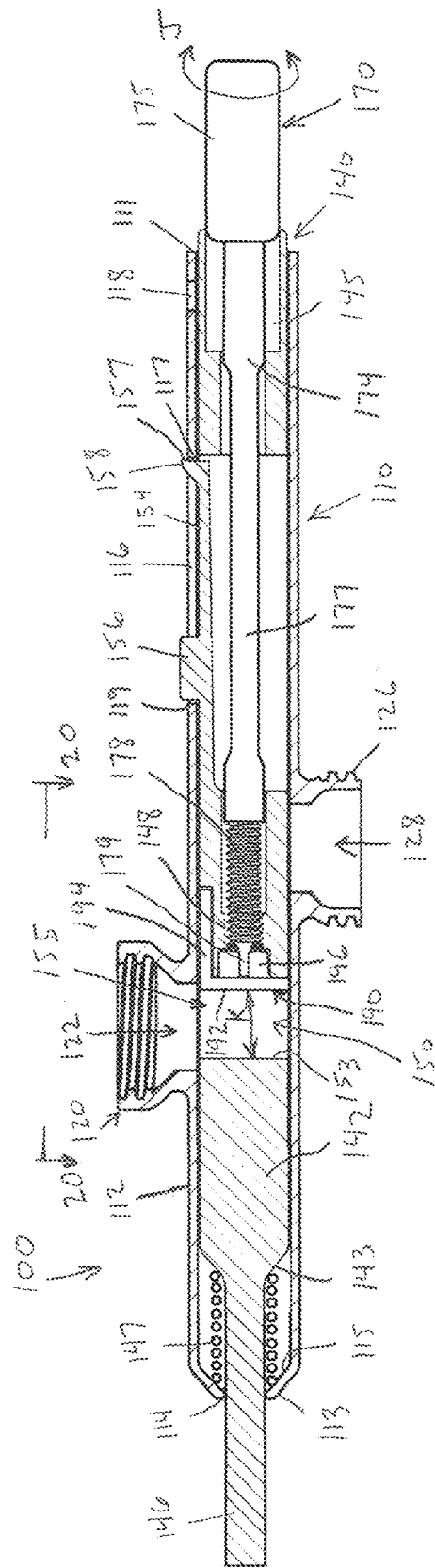
FIG. 19 is a cross-sectional view of the solids dispenser of FIG. 8 with the plunger in an initial position and the slider member in a maximum volume position.

Referring to FIGS. 9, 10 and 19, the outer housing 110 includes a generally hollow body 112 extending from a generally open end 111 to a generally closed end 113. In the illustrated embodiment, the generally closed end 113 includes an opening 114 for passage of a spring guide 146 extending from the plunger body 142. It is recognized that the spring guide may be eliminated and the spring otherwise guided within the outer housing 110. In such case, the opening 114 may also be eliminated. The inside surface 115 of the generally closed end 113 defines a spring surface 115 such that a spring 147 positioned within the housing 110 is compressible between the spring surface 115 and the plunger body 142 (see FIG. 19).

The housing body 112 defines a guide slot 116 and stop slot 118. The guide and stop slots 116, 118 are configured to receive a guide member 156 and a stop member 158 of the plunger 140 as will be described hereinafter. The guide slot 116 extends between a rear end 117 and a forward end 119 and defines the length of travel of the plunger 140 within the housing 110. The housing body 112 also defines an inlet connection 120 and an outlet connection 126. In the illustrated embodiment, the inlet connection 120 has internal threads 121 and the outlet connection 126 has external threads 127. It is recognized that other connection mechanisms may be utilized in place of or in combination with the threads 121, 127. Each of the connections 120, 126 defines a through passage 122, 128, respectively, in communication with the internal hollow chamber of the housing body 112. The length of the guide slot 116 corresponds with the distance between the axes of the through passages 122, 128 such that as the plunger 140 moves over its length of travel, the delivery chamber 155 will automatically align with either the inlet through passage 122 or the outlet through passage 128.

Referring to FIGS. 9, 14-17 and 23, inlet and outlet caps 200 and 210 which are configured to engage the inlet and outlet connections 120, 126, respectively, will be described. The inlet cap 200 has a generally cylindrical body 202 which defines a series of external threads 206 configured to engage threads 121 of the inlet connection 120. A set of internal threads 208 is defined at the opposite end of the body 202. The internal threads 208 are configured to engage threads 64 of a bottle 60 or the like containing the solids material 62. Again, while a threaded connection is illustrated, the invention is not limited to such and other connection methods may be utilized. With the illustrated embodiment, the threads overlap one another such that a clear path for the solids material is defined (see FIG. 23).

The outlet cap 210 has a generally cylindrical body portion 212 which defines a series of internal threads 218 configured to engage threads 127 of the outlet connection 126. A conical body portion 216 extends from the cylindrical body portion 212 and tapers to the outlet port 217. Again, while a threaded connection is illustrated, the invention is not limited to such and other connection methods may be utilized. Additionally, the size and configuration of the outlet port 217 may be varied to complement the solids material to be dispensed. Again, with the illustrated embodiment, the threads overlap one another such that a clear path for the solids material is defined (see FIG. 24).

The separate inlet and outlet caps 200, 210 provide versatility, allowing caps with various configurations to be utilized with the housing 110. The various caps can provide, for example, different connection mechanisms, different inlet and outlet opening sizes, and different configurations. While separate caps are illustrated, it is also contemplated that the caps or similar inlet and outlet structures may be formed integral with the outer housing 110.

Figure 12:
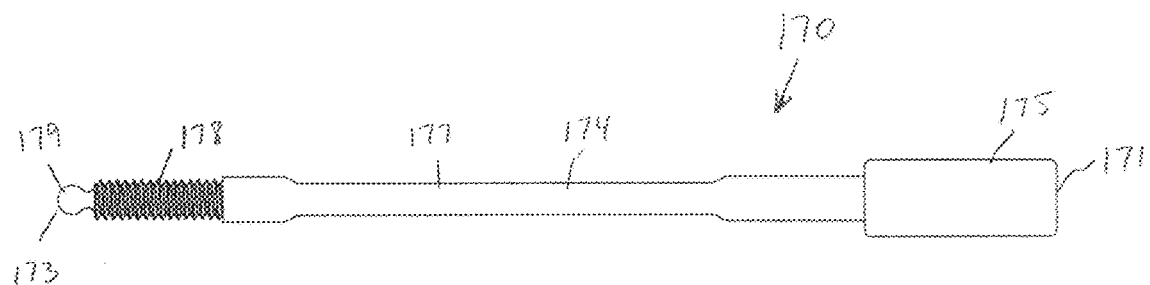
FIG. 12 is a plan view of an adjustment rod of the solids dispenser of FIG. 8.
Figure 13:
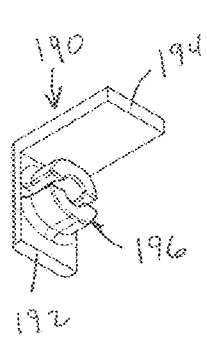
FIG. 13 is a perspective view of a slider member of the solids dispenser of FIG. 8.
Figure 14:
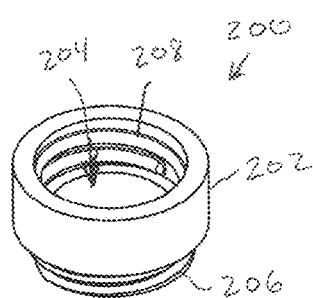
FIG. 14 is a perspective view of an inlet cap of the solids dispenser of FIG. 8.
Figure 15:
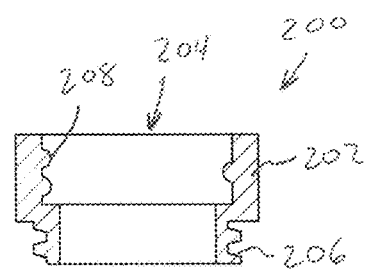
FIG. 15 is a cross-sectional view of the inlet cap of FIG. 14.
Figure 16:
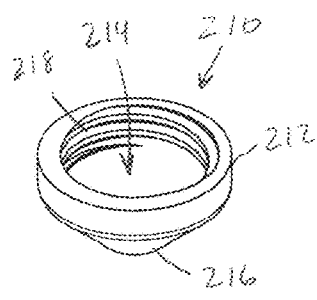
FIG. 16 is a perspective view of an outlet cap of the solids dispenser of FIG. 8.
Figure 17:
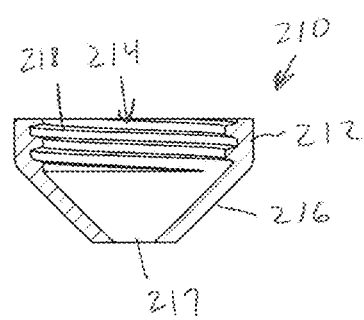
FIG. 17 is a cross-sectional view of the outlet cap of FIG. 16.

Turning to FIGS. 9, 11-13 and 18-22, the configuration of the plunger assembly will be described. The plunger assembly generally includes the plunger 140, the adjustment rod 170 and a slider member 190. As shown in FIG. 13, the slider member 190 includes first and second walls 192, 194 which extend generally perpendicular to one another. The first wall 192 defines a movable wall of the delivery chamber 155 while the second wall 194 stabilizes the slider member 190 relative to the plunger 140. A socket 196 extends from the inside surface of the first wall 192 and is configured to engage with a ball portion 179 of the adjustment rod 170. In the illustrated embodiment, the ball portion 179 snap fits within the socket 196.

Referring to FIG. 12, the adjustment rod 170 includes a body 174 extending from a rear end 171 to a forward end 173. The rear end 171 defines a grip portion 175 which will extend from the plunger 140 and allow rotation of the adjustment rod 170 relative to the plunger 140. The forward end 173 defines the ball portion 179 configured to engage the socket 196 in the slider member 190. While a ball and socket connection is illustrated, other connection assemblies may be utilized. A series of external threads 178 are defined on the rod body 174 adjacent the ball portion 179. As will be described, the threads 178 engage within the plunger 140 and facilitate lateral movement of the adjustment arm 170 relative to the plunger 140, thereby adjusting the position of the slider member 190. Adjusting the position of the slider member 190 adjusts the volume of the delivery chamber 155, as will be described in more detail hereinafter. In the illustrated embodiment, the rod body 172 includes a reduced diameter portion 177 to provide clearance for the release mechanism as will be described hereinafter.

The plunger 140 includes a body 142 extending from a generally open end 141 to a closed end 143. The spring guide 146 extends from the closed end 143 of the plunger body 142. As explained above, the spring 147 is positioned about the spring guide 146 such that the spring guide 146 maintains the spring 147 in proper position as the plunger 140 moves back and forth between the initial position and the dispensing position. It is contemplated that alternative structure, for example a holding tube at the closed end 113 of the outer housing 110, may be utilized such that the spring guide 146 may be reduced in size or eliminated.

A passage 145 extends through the body 142 from the open end 141 to a screw block 148 positioned along the body 142. The screw block 148 defines a series of internal threads 147 configured to engage threads 178 on the adjustment rod 170 as will be described hereinafter. A through passage 150 extends through the plunger body 142 from the top surface to the bottom surface thereof. The through passage 150 is forward of the screw block 148. A recess 151 defined along the top of the screw block 148 extends to the through passage 150 such that the L-shaped slider member 190 may be positioned with the first wall 192 extending into the through passage 150 and the second wall 194 supported on the screw block 148 within the recess 151. A blind bore 149 is defined on the forward end of the screw block 148 (see FIG. 21) and is configured to receive the socket 196 of the slider member 190.

Figure 18:
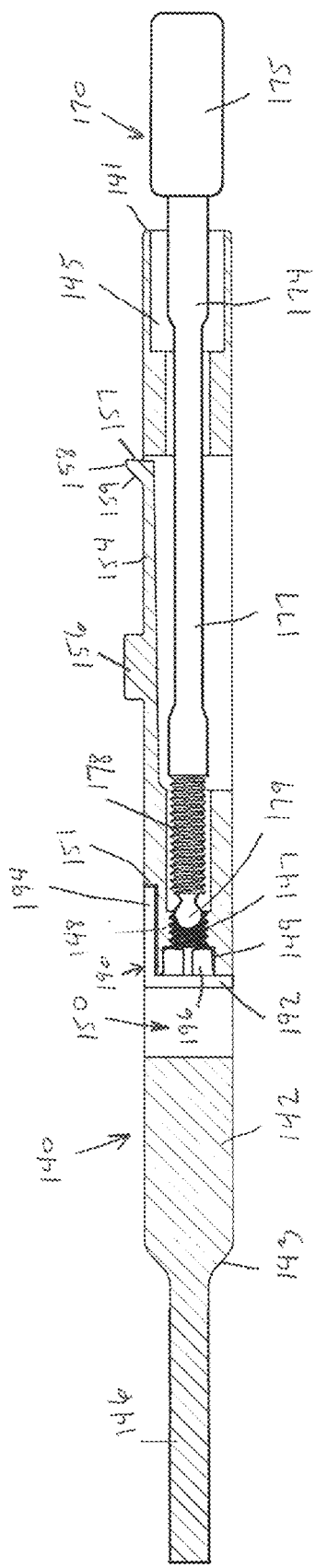
FIG. 18 is a cross-sectional view of the plunger assembly of the solids dispenser of FIG. 8.

FIG. 18 illustrates the plunger assembly prior to initial setup. The slider member 190 is positioned loosely in the through passage 150 with the second wall 194 in the recess 151 and the socket extending into the blind bore 149. The assembler holds the slider member 190 in this position as the adjustment rod 170 is inserted into the bore 145 and threadably engaged with the screw block threads 147. The adjustment rod 170 is rotated as indicated by arrow J in FIG. 19, thereby advancing the adjustment rod 170 until the ball portion 179 snap fits into the socket 196.

Figure 21:
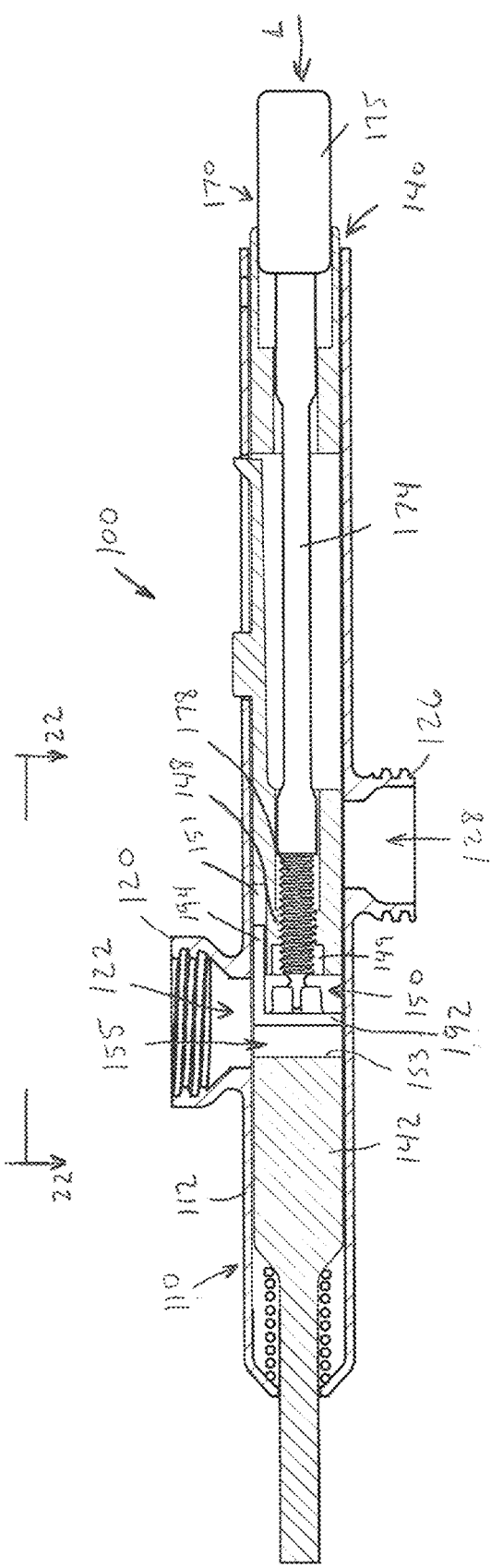
FIG. 21 is a cross-sectional view of the solids dispenser of FIG. 8 with the plunger in an initial position and the slider member in a reduced volume position.
Figure 20:
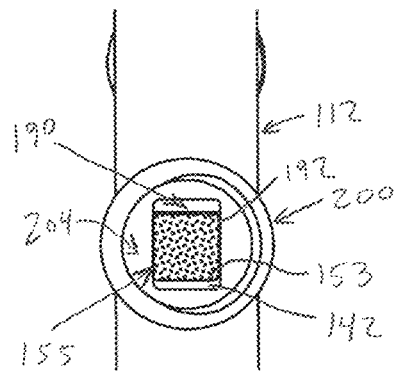
FIG. 20 is a plan view along the line 20-20 in FIG. 19.
Figure 22:
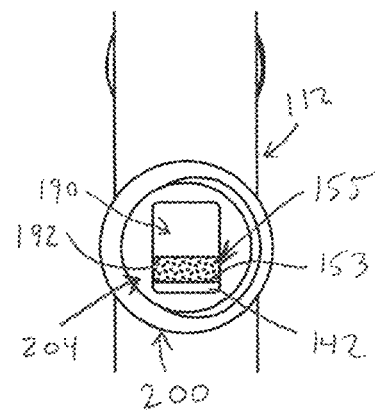
FIG. 22 is a plan view along the line 22-22 in FIG. 21.

With the adjustment rod 170 connected to the slider member 190, the volume of the delivery chamber 155 may be adjusted to a desired volume. FIGS. 19 and 20 illustrate the slider member 190 against the screw block 148 such that the delivery chamber 155 between the first wall 192 and the wall 153 of the through passage 150 has a maximum width K. Rotating of the adjustment rod 170 causes the slider member 190 to move toward the wall 153 as indicated by arrow L in FIG. 21. FIGS. 21 and 22 illustrate the delivery chamber 155 with a reduced volume.

Referring again to FIGS. 11, 18 and 19, the plunger body 142 includes a cantilevered arm 154 which supports the guide member 156 and the stop member 158. The stop member 158 includes a forward ramped surface 159 and a perpendicular stop surface 157. The stop member 158 is positioned adjacent the free end of the arm 154 and is thereby pivotal between the natural position illustrated in FIG. 18 and a position inside of the passage 145. In the initial position illustrated in FIG. 19, the stop surface 157 of the stop member 158 is engaged against the rear end 117 of the guide slot 116 of the outer housing 110. As such, the stop member 158 maintains the plunger 140 in a fixed position against the bias of the compressed spring 147. In this position, the delivery chamber 155 is aligned with the through passage 122 of the inlet connection 120. Depressing of the arm 154 causes the stop member 148 to move within the passage 145 and to disengage from guide slot 116. Once the stop member 158 is disengaged from the guide slot 116, the spring 147 causes the plunger 140 to automatically move to the dispensing position aligned with through passage 128 of the outlet connection 126 (see FIG. 24). The guide member 146 contacts the rear end 117 of the guide slot 116 to prevent further rearward travel. Additionally, the stop member 158 enters the stop slot 118 in the rear portion of the outer housing 110 such that the arm 154 is not required to remain in a flexed position.

Figure 23:
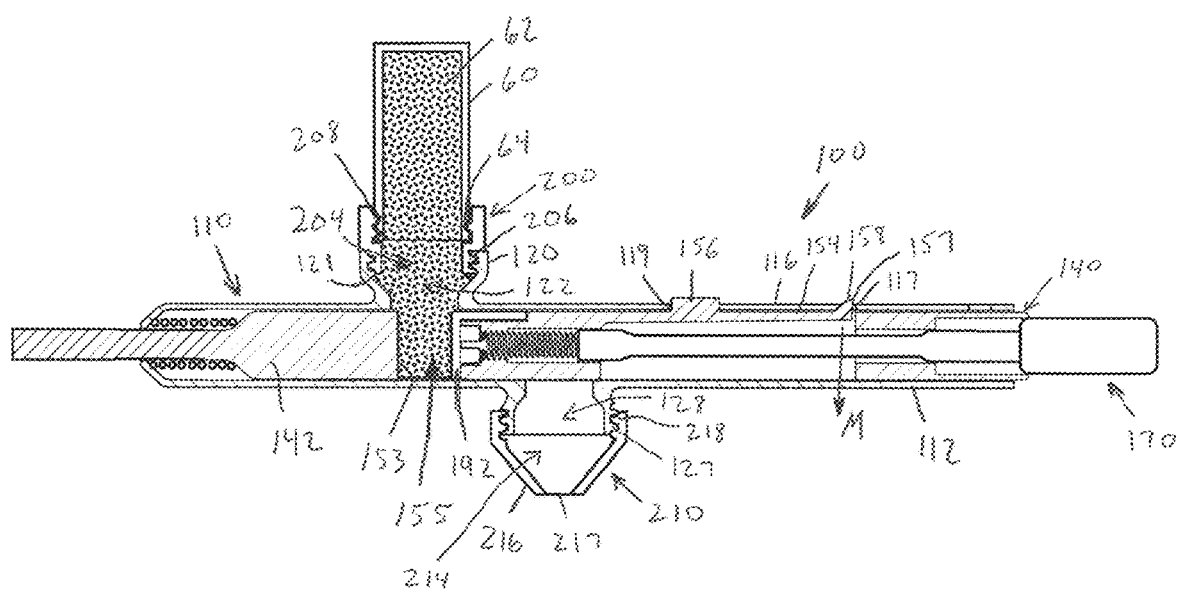
FIG. 23 is a cross-sectional view of the solids dispenser of FIG. 8 with the plunger in an initial position and a solids material bottle attached thereto.

Having generally described the components of the handheld solids dispenser 100, operation thereof will be described with reference to FIGS. 23 and 24. After the plunger assembly has been assembled as described above, it is inserted into the outer housing 110 and advanced to the initial position shown in FIG. 23. In this position, the stop member 158 is engaged with the rear end 117 of the guide slot 116, the spring 147 is compressed, and the delivery chamber 155 is aligned with the through passage 122 of the inlet connection 120. The grip portion 175 may be utilized to adjust the volume of the delivery chamber 155 to a desired volume. The inlet and outlet caps 200 and 210 are secured to the inlet and outlet connections 120, 126, respectively. The dispenser 100 is ready for use.

A bottle 60 of solids material 62, or the like, is secured to the inlet cap 200. The dispenser 100 may be inverted while the bottle is attached to prevent spillage. Once the bottle 60 is attached, a clear path is defined from the bottle 60 through the passages 204 and 122 to the delivery chamber 155. Once the dispenser 100 is returned to its upright position as shown in FIG. 23, solids material 62 will flow via gravity into the delivery chamber 155. Once the delivery chamber 155 is full, the cantilevered arm 154 is depressed, for example, by pushing down on the guide member 156 or the stop member 158. Depressing of the arm 154 causes the stop member 158 to disengage from the guide slot 116 and the spring 147 biases the plunger 140 toward the dispensing position as indicated by arrow N in FIG. 24.

As the plunger 140 moves rearward, the plunger body 142 seals the through passage 122 of the inlet connection 120. The plunger 140 moves rearward until the guide block 156 engages the rear end 117 of the guide slot 116, at which time the plunger 140 is in the dispensing position shown in FIG. 24. In this position, the delivery chamber 155 is aligned with the through passage 128 of the outlet connection 126. The solids material 62 in the delivery chamber 155 is free to flow via gravity through the passages 128, 214 to the outlet port 217.

Figure 24:
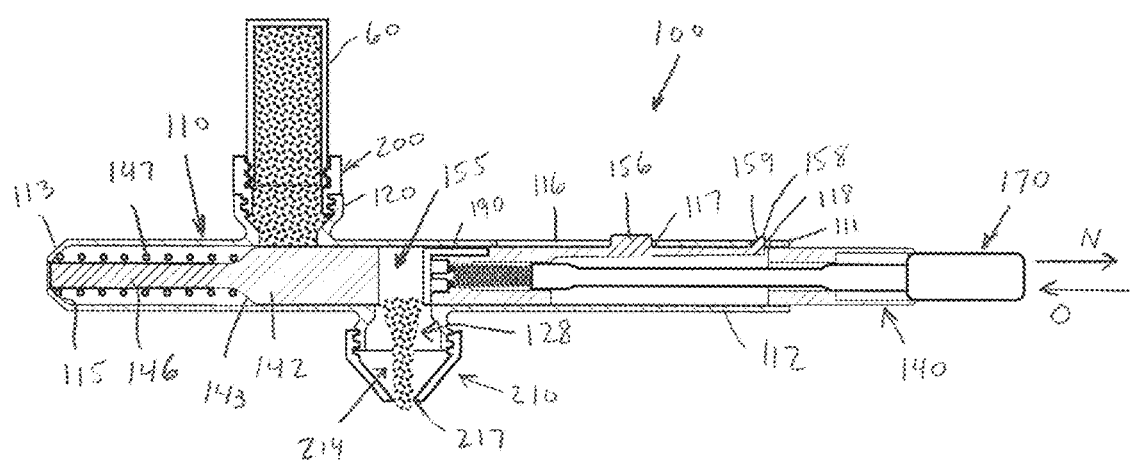
FIG. 24 is a cross-sectional view similar to FIG. 23 with the plunger in a dispensing position.

Once the solids material is delivered, the process may be quickly repeated by pushing the plunger 140 back to the initial position as indicated by the arrow O in FIG. 24. It is noted that the ramped surface 159 causes the stop member 158 to move within the passage 145 as the plunger 140 is pushed into the outer housing 110. The plunger 140 is pushed forward until the stop member 158 is received in the guide slot 116 such that the plunger 140 is once again in the initial position. Solids material 62 will again flow via gravity into the delivery chamber 155 and the delivery process may be quickly and accurately repeated.

Figure 25:
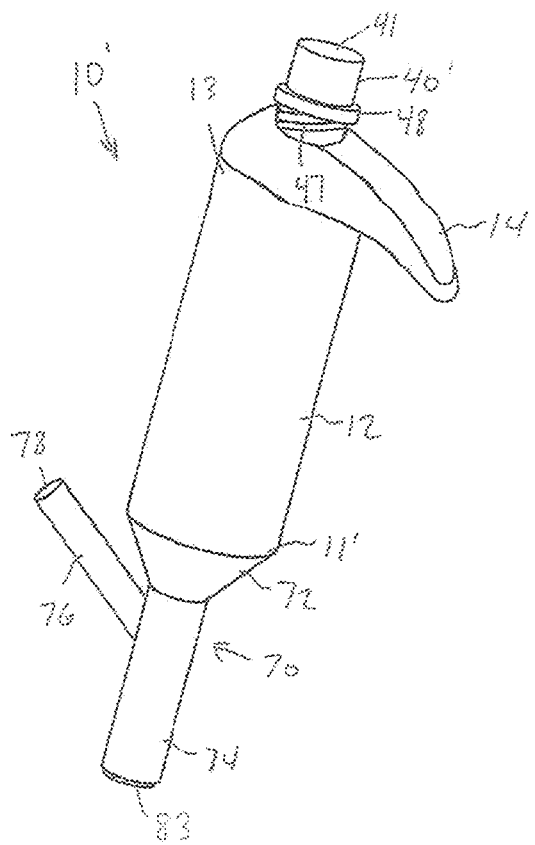
FIG. 25 is a perspective view of a solids dispenser in accordance with another embodiment of the invention.
Figure 26:
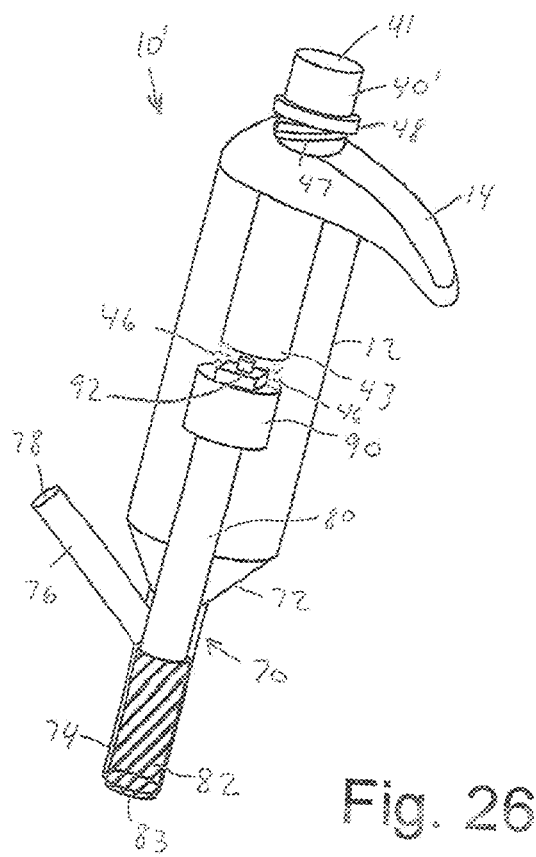
FIG. 26 is a perspective view of the solids dispenser of FIG. 25 with several components shown transparently.

Referring to FIGS. 25 and 26, a handheld solids dispenser 10' in accordance with another embodiment of the invention will be described. As in the first embodiment, the dispenser includes a housing 12 extending from a first end 11' and to a second end 13. The second end 13 again supports the plunger 40' and may include a handle 14. In the present embodiment, the first end 11' is configured for connection of a dispensing housing 70 thereto. The illustrated dispensing housing 70 includes a conical portion 72 extending to a delivery tube 74 and an input tube 76 with an opening 78. A delivery shaft 80 with a screw conveyor 82 is positioned within the housing 12 such that the screw conveyor 82 extends through the delivery tube 74. As illustrated, the screw conveyor 82 may have a tip 83 which extends beyond the end of the delivery tube 74.

Within the housing 12, the delivery shaft 80 is connected to a drive motor 90. The motor 90 is configured to rotate in response to a switch 92 associated therewith. The switch 92 is configured to be engaged by the internal end 43 of the plunger 40' to control the motor 90. In the illustrated embodiment, the switch 92 is a pressure switch such that increased pressure on the switch 92 will cause the screw conveyor 82 to rotate longer and/or faster to deliver more material received from the input tube 76. To set the amount of material delivered, the end 41 of the plunger 40' external to the housing 12 includes a setting ring 48 which is threadably adjustable on threads 47. Moving the ring 48 closer to the housing 12 will minimize the amount the plunger 40' may be depressed, thereby lowering the amount of solids material delivered. Rotating the ring 48 away from the housing 12 allows the plunger 40' to be depressed further, thereby causing greater pressure on the pressure switch 92, resulting in dispensing of more material. It is contemplated that the motor 90 may be configured for reversed actuation such that the screw conveyor 82 may be operated in the opposite direction such that the tip 83 may remove material if excess is delivered.

Figure 27:
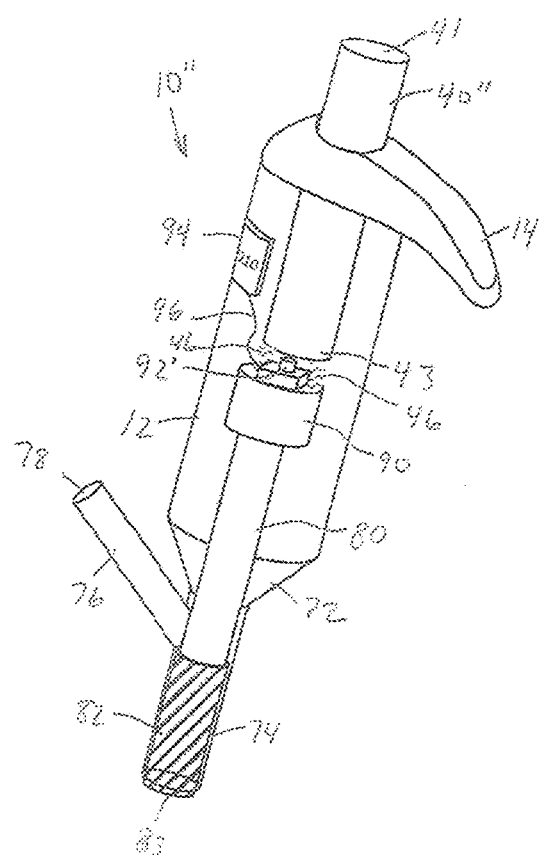
FIG. 27 is a perspective view similar to FIG. 26 illustrating another embodiment of the invention.

Referring to FIG. 27, a handheld solids dispenser 10" in accordance with another embodiment of the invention will be described. The dispenser 10" is substantially the same as in the previous embodiment except that the dispensing amount is controlled electronically. More specifically, the switch 92' includes an internal processor in communication with an input screen 94. The technician sets a desired delivery amount on the input screen 94 and the switch processor receives the desired delivery amount and controls the motor 90 to deliver such desired amount. As such, the plunger 40" does not include any setting elements. Instead, depressing of the plunger 40" will actuate the switch 92 which will in turn control the motor 90 to dispense the desired amount.

Figure 29:
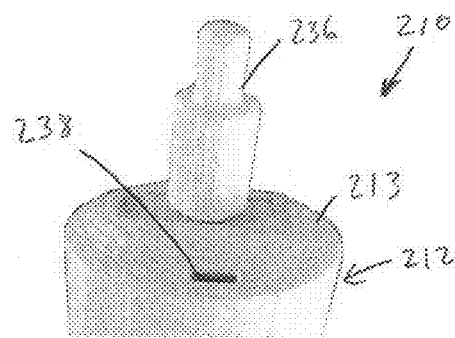
FIG. 29 is an end perspective view of the solids dispenser of FIG. 28.
Figure 30:
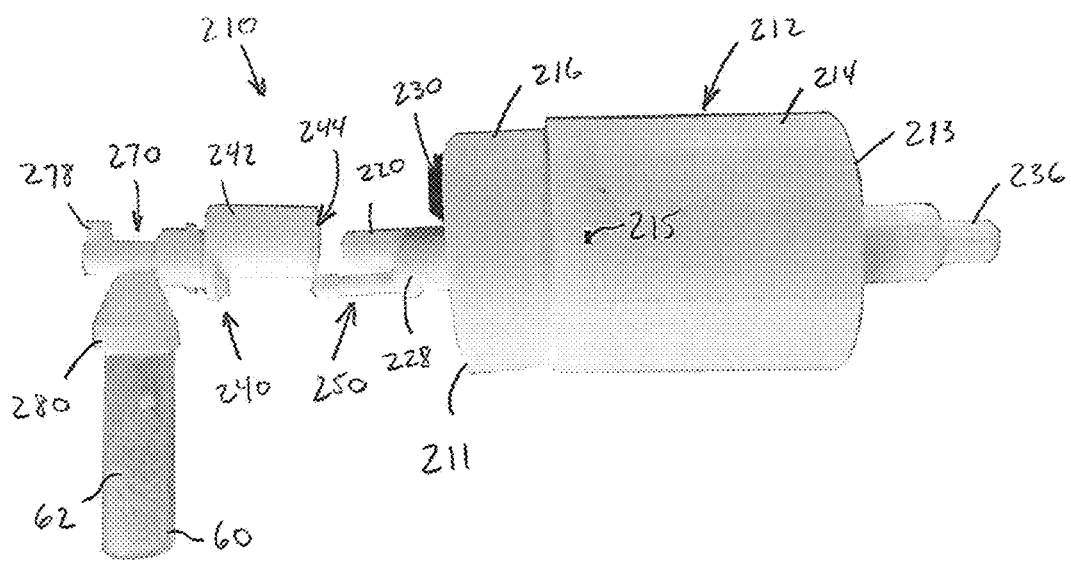
FIG. 30 is a partially exploded side elevational view of the solids dispenser of FIG. 28.
Figures 31, 32:
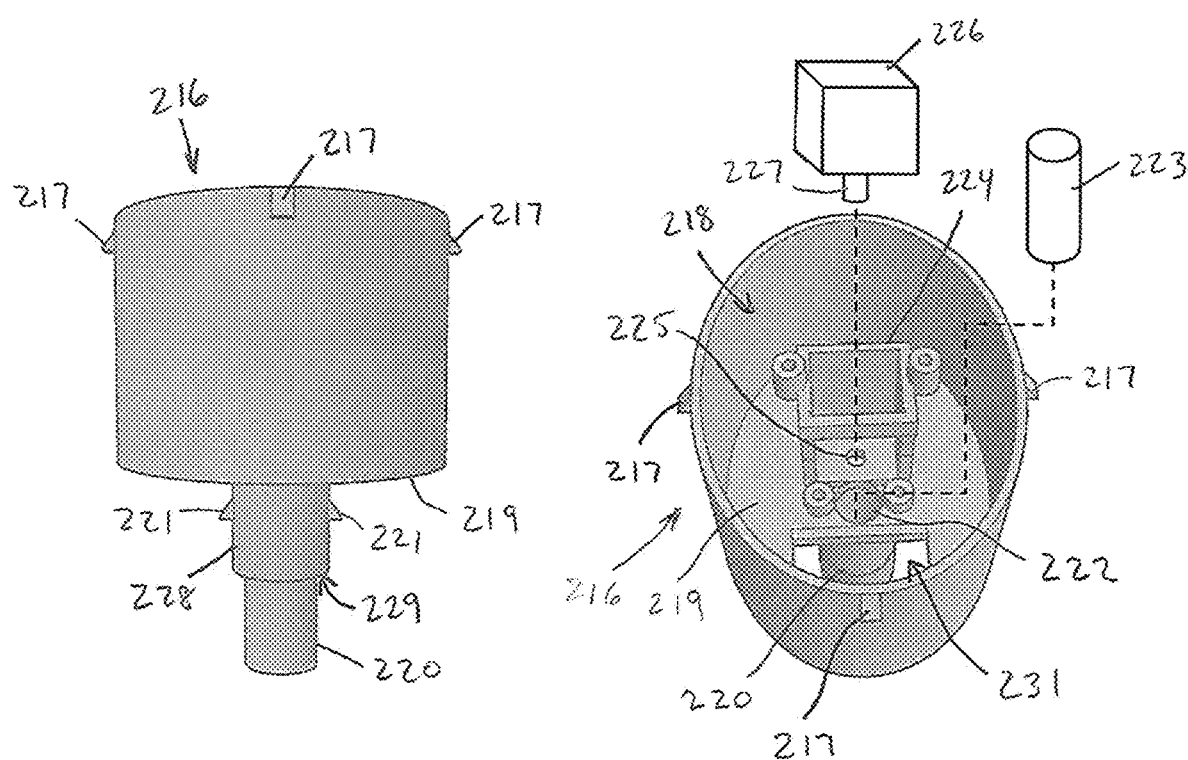
FIGS. 31 and 32 are side elevation and top perspective views, respectively, of the inner housing member of the solids dispenser of FIG. 28.

Referring to FIGS. 28-40, a handheld solids dispenser 210 in accordance with another embodiment of the invention will be described. The dispenser includes a housing 212 extending from a first end 211 to a second end 213. In the present embodiment, the housing 212 is a two part housing with a outer housing member 214 and an inner housing member 216. The housing may have other configurations, for example upper and lower housing halves or a generally unitary housing with a door or the like to access the inside thereof. As shown in FIGS. 30-32, the inner housing member 216 includes a plurality of projections 217 configured to snap fit within corresponding slots 215 on the outer housing member 214.

The first end 211 of the housing 212 is configured for connection of a dispensing housing 270 thereto via a connecting member 240, each of which will be described hereinafter. A vibration motor housing 220 and a drive shaft 250 extend from the first end 211 (see FIG. 30) and are enclosed within the connecting member 240 (see FIG. 28). In the illustrated embodiment, the motor actuation switch 230 is also positioned along the first end 211 of the housing 212. It is understood that the switch may be positioned at any desired location relative to the housing 212. A speed control knob 236 extends from the second end 213 of the housing 212, although it may be otherwise positioned on the housing 212. The illustrated speed control knob 236 is a rotatory knob which is associated with the drive motor 226 positioned within the inner housing member 216 and the vibration motor 223 positioned within the motor housing 220. Rotation of the control knob 236 causes the drive motor 226 to increase or decrease in speed and the vibration motor 223 to increase or decrease in vibration. While a rotary knob is shown, the control may have other configurations, for example, a slide mechanism. In the illustrated embodiment, the second end 213 of the housing 212 also defines a charging port 238 which facilitates charging of the power source, e.g. a rechargeable battery, within the housing 212. While illustrated on the second end 213, the charging port 238 may be otherwise positioned along the housing 212.

Referring to FIGS. 31 and 32, the inner housing 216 will be described in greater detail. The inner housing 216 includes a side wall 218 extending from an end wall 219 about a generally open area. An opening 231 is defined in the end wall 219 which is configured to support the switch 230. The switch 230 extends into the inner housing 216 and is connected to a control board (not shown), for example, a PCB. The control board is also connected to the drive motor 226, the vibration motor 223, a power source (not shown) and the control knob 236. The switch 230 is preferably a three-way switch, having an off, forward and reverse position. In the forward position, the drive motor 226 rotates the screw conveyor 260 such that solids material is delivered from the inlet 280 to the outlet opening 279. The reverse position allows material within the helical screw blade 268 to be returned to the dispensing bottle 60 or the like. Additionally, the screw conveyor 260 may extend from the dispensing housing 270, at least in part, such that the tip of the screw conveyor 260 may positioned in a solids material source, e.g. a bottle or pile of material, and the drive motor 226 operated in the reverse direction such that the screw conveyor 260 delivers material back to the bottle 60 attached to the inlet 280. Alternatively, the switch 230 may be a two-way switch with an off and forward position. To clear the screw conveyor 260, with the motor off, the bottle 60 would be removed from the dispensing housing 270 and aligned with the dispensing outlet 278. The drive motor 226 would then be actuated and the screw conveyor 260 would deliver any remaining solids material to the bottle through the dispensing outlet.

The vibration motor housing 220 extends from the end wall 219. A connection skirt 228 also extends from the end wall 219 and may be formed integral with the vibration motor housing 220 or may extend thereabout. The connection skirt 228 extends about an opening 225 in the end wall 219 through which the motor shaft 227 extends. The connection skirt 228 has an open end 229 configured to receive the drive shaft 250 as will be described hereinafter. A pair of projections 221 extend from the connection skirt 228 and are configured to engage slots 245 in the connecting member 240. The vibration motor 223 is positioned securely in the motor housing 220 through an opening 222 in the end wall 219. The vibration motor 223 is a vibratory motor such that when the vibration motor 223 is actuated, it causes the connecting member 240, and thereby the dispensing housing 270, to vibrate. Vibration of the dispensing housing 270 helps promote flow of the solids material, as will be described hereinafter.

The drive motor 226 is positioned securely within a motor support 224 within the inner housing 216. A motor shaft 227 extends from the drive motor 226. The motor shaft 227 extends through the opening 225 in the end wall 219 and is configured for secure connection with the drive shaft 250. The drive motor 226 preferably provides high torque directly to the drive shaft 250, however, gears or the like may be associated with the motor shaft 227 to provide a desired torque. While the vibration motor 223 and drive motor 226 are shown as separate components, it is contemplated that the functions may be provided by a single motor. Additionally, while the vibration motor 223 and the drive motor 226 are shown controlled by a single switch and control knob, it is contemplated that they may be separately controlled.

Figure 34:
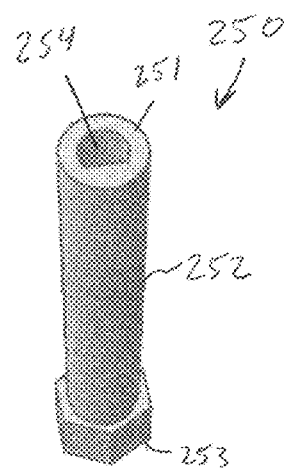
FIGS. 34 and 35 are top perspective and bottom plan views, respectively, of the drive shaft of the solids dispenser of FIG. 28.
Figure 35:
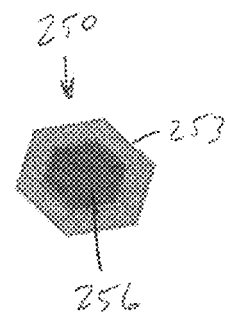
Figure 36:
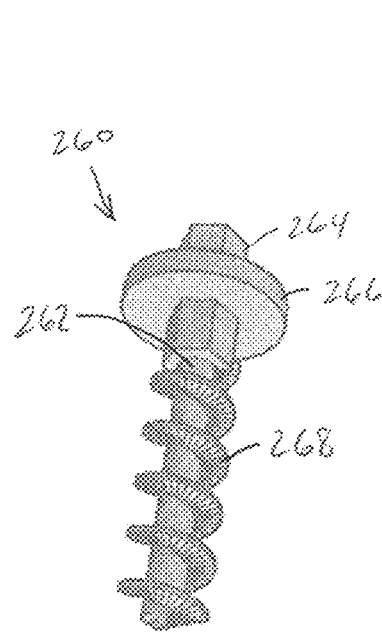
FIGS. 36 and 37 are perspective views of illustrative screw conveyors.

Referring to FIGS. 34 and 35, the draft shaft 250 the present embodiment will be described. The drive shaft 250 includes a shaft body 252 extending between first and second ends 251, 253. The first end 251 includes a recess configured to receive and securely engage the motor shaft 227. In the illustrated embodiment, the recess 251 has a D configuration such that the flat surface prevents rotation of the motor shaft 227 relative to the drive shaft 250. Other engaging configurations may also be utilized. The second end 253 of the drive shaft 250 defines a screw receiving recess 256. The screw receiving recess 256 is configured to receive and secure the head 264 of the screw conveyors 260, 260' as will be described in hereinafter. In the illustrated embodiment, the recess 256 has a hexagonal shape, but other shapes may be utilized. As shown in FIG. 30, the assembled drive shaft 250 extends proximate to the vibration motor housing 220.

Figure 33:
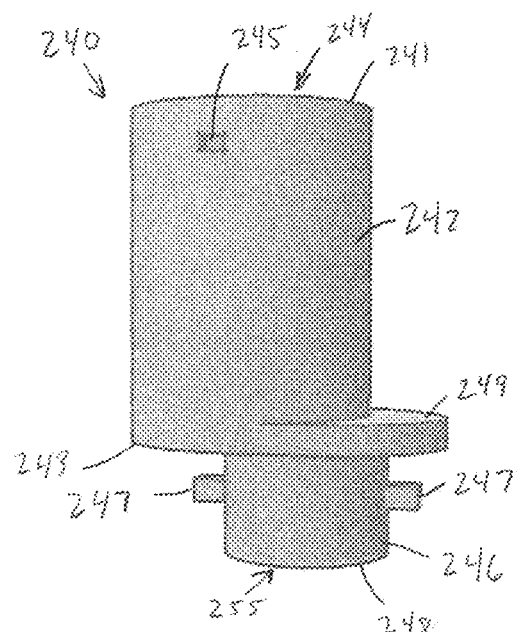
FIG. 33 is a side elevation view of the connection member of the solids dispenser of FIG. 28.

Referring to FIGS. 30 and 33, the connecting member 240 of the present embodiment will be described. The connecting member 240 has a rear body portion 242 extending from a first end 241 to a second end 243 and a forward body portion 246 extending from the second end 243 of the rear body portion 242 to a free end 248. The rear body portion 242 includes an opening 244 at the first end 241 and the forward body portion 246 includes an opening 255 at the free end 248. The connecting member 240 is generally hollow between the openings 244 and 255. The opening 244 is configured to fit about the vibration motor housing 220 and the connection skirt 228. Slots 245 in the rear body portion 242 adjacent the first end 241 engage the projections 221 from the connection skirt 228 to secure the connecting member 240 to the inner housing 216 with the vibration motor housing 220 and the drive shaft 250 extending therein. The drive shaft 250 has a length between its ends 251, 253 which is approximately the same as or slightly longer than the length of the rear body portion 242 between its ends 241, 243. As such, the screw receiving recess 256 is positioned proximate to or within the forward body portion 246.

Figure 37:
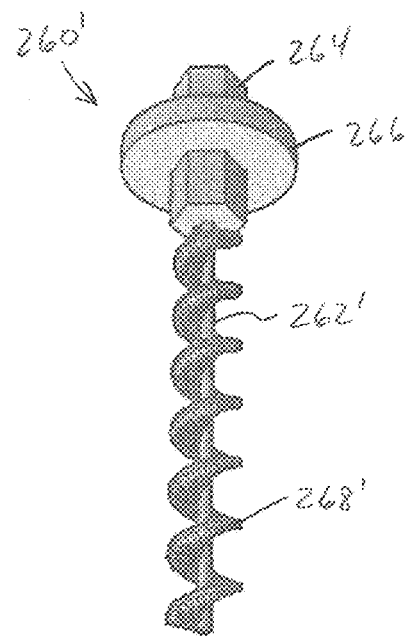

The opening 255 is configured to receive the shoulder 266 of one of the screw conveyors 260. More specifically, with reference to FIG. 36, an exemplary screw conveyor 260 includes a shaft 262 extending from a head 264 to a free end. The shoulder 266 is defined adjacent the head 264 and is configured to fit slidingly within the opening 255 to provide support to the screw conveyor 260. The head 264 has a configuration which complements the configuration of the screw receiving recess 256. In the illustrated embodiment, the head 264 has a hexagonal configuration, however, other configurations may be utilized. A helical screw blade 268 extends along the shaft 262 from proximate the shoulder 266 to the free end. The rate of volume transfer by the screw blade 268 is proportional to the rotation rate of the shaft 262 which is controlled by the drive motor 226 and control knob 236. Referring to FIG. 37, another exemplary screw conveyor 260' is shown. The screw conveyor 260' is substantially the same as the previous embodiment, however, the length and thickness of the shaft 262' and the pitch of the helical screw blade 268' is modified. The dispenser 210 may be provided with screw conveyors 260, 260' with various configurations to handle various materials. With the connecting member 240 positioned on the inner housing 216, the head 264 may be extended into the opening 255 until the head 264 is received and secured in the recess 256 of the drive shaft 250. The shaft 262 and blade 268 portion of the screw conveyor 260 will extend from the free end 248 of the forward body portion 246.

A pair of lugs 247 extend outwardly from the forward body portion 246. The lugs 247 are configured to be received in slots 275 in the dispensing housing 270 to secure the dispensing housing 270 to the connecting member 240. Additionally, a shoulder 249 extends from the connecting member 240 at the junction between the rear and forward body portions 242, 246. The shoulder 249 provides additional support for the dispensing housing 270.

Figure 38:
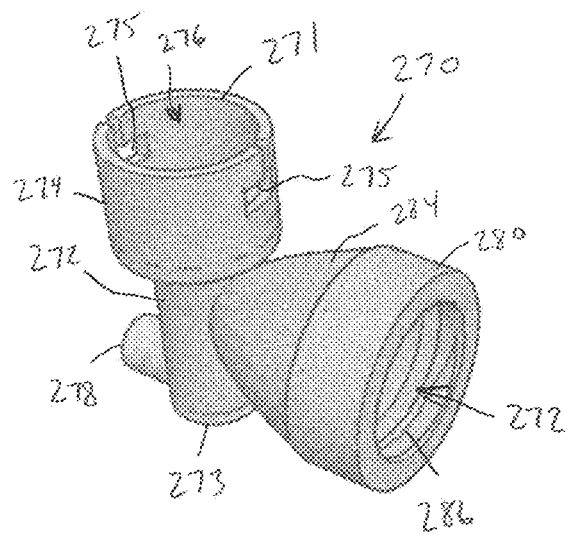
FIGS. 38-40 are side perspective, side elevation and bottom perspective views, respectively, of the dispensing housing of the solids dispenser of FIG. 28.
Figure 39:
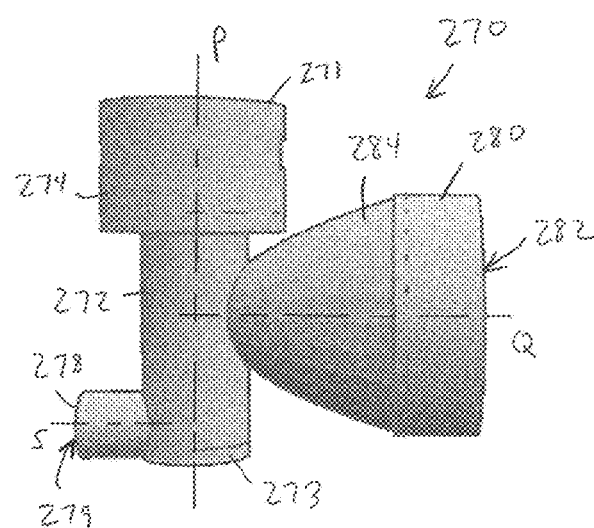
Figure 40:
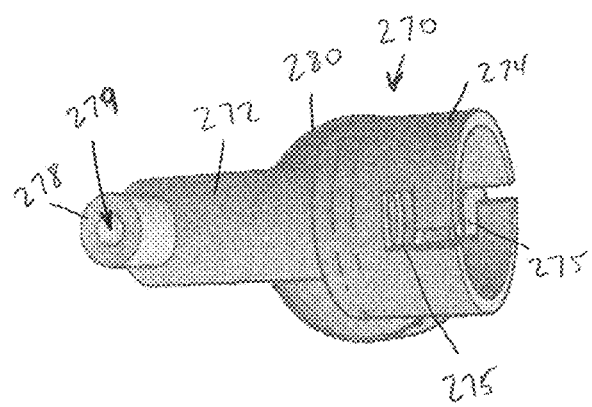

Referring to FIGS. 38-40, the illustrated dispensing housing 270 includes a hollow tubular body 272 extending from a first end 271 to a second end 273 with a passage 276 therethrough. The first end 271 includes a portion 274 with a larger diameter configured to fit about the forward body portion 246 of the connecting member 240. L-shaped slots 275 are defined in the larger diameter portion 274 and are configured to releasably receive the lugs 247. While the slots 275 are illustrated as L-shaped, they may have other configurations which facilitate a secure, releasable connection. The dispensing housing 270 is slid over the lugs 247 and then twisted to lock the lugs 247 within the slots. In the illustrated embodiment, the second end 273 is closed and an outlet 278 extends perpendicular thereto and defines an outlet opening 279. It is contemplated that the second end 273 could have an opening which defines the outlet opening. In such an embodiment, the outlet 278 would not be required and the second end 273 would directly define the outlet opening 279. The distance between the first and second ends 271, 273 is chosen such that the shaft 262 of the screw conveyor 260 extends the length of the passage 276 when the dispensing housing 270 is connected to the connecting member 240. The dispenser 210 may have multiple dispenser housings 270 with each having a length and diameter which complements the length and diameter of a chosen screw conveyor 260, 260'.

An inlet 280 extends from the tubular body 272 opposite to the outlet 278. The inlet 280 includes a passage 282 which opens into the passage 276. In the illustrated embodiment, the inlet 280 includes a tapered portion 284 such that solids material from a larger source (e.g. bottle) may be delivered to the narrower passage 276. Threads 286 or other connecting mechanisms are provided within the inlet 280 to securely connect a bottle or the like to the inlet. In the illustrated embodiment, the central axis Q of the inlet passage 282 is perpendicular to the axis P of the body passage 276, however, the axes P, Q may be otherwise angled relative to one another. Similarly, the central axis Q of the inlet passage 282 is parallel to the axis S of the outlet opening 279, however, the axes Q, S may be otherwise angled relative to one another. It is noted that the inlet passage axis Q is laterally offset from the outlet opening axis S. As such, the solids material travel from the inlet passage 282 into the body passage 276 and then will be delivered by the screw conveyor 260 to the outlet opening 279.

Figure 41:
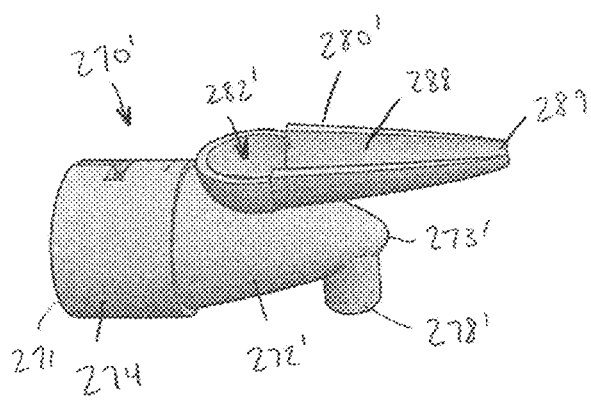
FIG. 41 is a side perspective view of a dispensing housing in accordance with another embodiment of the invention.

Referring to FIG. 41, a dispensing housing 270' in accordance with another embodiment of the invention will be described. The dispensing housing 270' is substantially the same as the previous embodiment and only the differences will be described. In the present embodiment, the body portion 272' has a tapered configuration, narrowing toward the second end 273'. Additionally, the inlet 280' is configured to scoop solids material. To facilitate such, the inlet 280' includes an open, semicircular body 288 extending to an open tip 289. The open tip 289 is slid into a pile of material and then the body 288 tilted such that the solids material thereon passes to the inlet passage 282'. It is recognized that in addition to the semicircular body 288, the inlet 280' may additionally include a bottle receiver such that it can be used either with a bottle or to scoop. In other respects, the dispensing housing 270 functions in a manner as described with respect to the previous embodiment.

Figure 28:
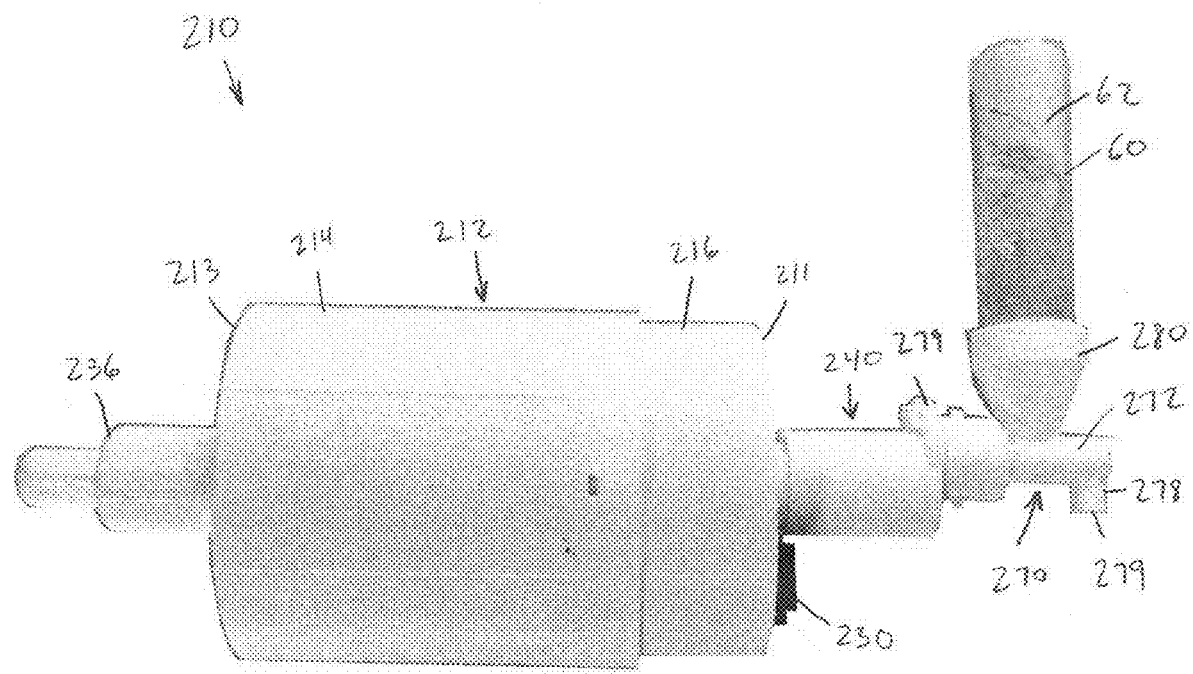
FIG. 28 is a side elevational view of a solids dispenser in accordance with another embodiment of the invention.

Having described the components of the dispenser 210, use and operation thereof will be described with reference to FIGS. 28-30. A desired screw conveyor 260 is connected to the drive shaft 250. The dispensing housing 270 is then positioned over the screw conveyor 260 and connected to the connecting member 240 via the lugs 247 being secured within the L-shaped slots 275. A bottle 60 of solids material 62 is connected to the inlet 280. The material 62 will flow through the inlet passage 282 into the body passage 276 and into contact with the screw conveyor 260. The switch 230 is moved to the forward position such that the motor shaft 227 is rotated in the forward direction. Such rotation causes the drive shaft 250, and thereby the screw conveyor 260, to rotate in the forward direction. The control knob 236 may be utilized to adjust the speed of rotation and the amount of vibration. The rotating screw conveyor 260 delivers the solids material to the outlet opening 279. The vibration caused by vibration motor 223 may be utilized to aid in the flow of some materials. Once a desired amount of solids material is delivered, for example, as evidenced by a scale, the switch 230 is moved to the off position. The dispenser 210 may also be configured to include an input panel which allows a desired amount of material to be input and the motor controlled to deliver such amount, similar to as described in the previous embodiment. If no further dispensing is necessary, the switch 230 may be moved to the reverse position such that any material remaining within the helical screw blade 268 is delivered back to the bottle 60.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A handheld solids dispenser comprising:
a housing defining an inlet passage and an outlet passage;
a delivery mechanism supported within the housing and positioned between the inlet passage and the outlet passage,
wherein actuation of the delivery mechanism causes the delivery mechanism to transport a desired amount of solids material from the inlet passage to the outlet passage, and
wherein the delivery mechanism is a screw conveyor driven by a drive motor and actuation of the drive motor in a first direction causes the screw conveyor to deliver the material in a direction from the inlet passage to the outlet passage and actuation of the drive motor in a second, opposite direction causes the screw conveyor to deliver the material in a direction from the outlet passage toward the inlet passage.

2. The handheld solids dispenser according to claim 1 wherein a passage extends between the inlet passage and the outlet passage and the screw conveyor extends within the passage.

3. The handheld solids dispenser according to claim 2 wherein the screw conveyor includes a shaft with a helical screw blade extending therefrom, the shaft having a length and the helical screw blade having a diameter.

4. The handheld solids dispenser according to claim 3 wherein the passage has a diameter and length corresponding to the blade diameter and the shaft length.

5. The handheld solids dispenser according to claim 1 wherein the drive motor is supported within a primary housing and the housing is removably connectable to the primary housing.

6. The handheld solids dispenser according to claim 5 wherein the primary housing supports a switch in communication with the drive motor, the switch defining the actuation mechanism utilized to control actuation of the drive motor and thereby rotation of the screw conveyor.

7. The handheld solids dispenser according to claim 1 further comprising a control mechanism which is adjustable to adjust the speed of rotation of the drive motor.

8. A handheld solids dispenser comprising:
a housing defining an inlet passage and an outlet passage;
a delivery mechanism supported within the housing and positioned between the inlet passage and the outlet passage,
wherein actuation of the delivery mechanism causes the delivery mechanism to transport a desired amount of solids material from the inlet passage to the outlet passage, and
wherein the delivery mechanism is a screw conveyor driven by a drive motor, the drive motor is supported within a primary housing and the housing is removably connectable to the primary housing, further comprising a vibratory motor supported by the primary housing.

9. The handheld solids dispenser according to claim 8 further comprising a control mechanism which is adjustable to adjust the vibration of the vibratory motor.

* * * * *